(12) United States Patent
Moore et al.

(10) Patent No.: US 10,834,236 B2
(45) Date of Patent: Nov. 10, 2020

(54) SERVER-DRIVEN CUSTOM CONTEXT MENUS

(71) Applicant: ADOBE INC., San Jose, CA (US)

(72) Inventors: Neil Charles Armour Moore, Edinburgh (GB); Adrian John O'Lenskie, Dunblane (GB)

( * ) Notice: Subject to any disclaimer, the term of this patent is extended or adjusted under 35 U.S.C. 154(b) by 599 days.

(21) Appl. No.: 15/340,066

(22) Filed: Nov. 1, 2016

(65) Prior Publication Data
US 2018/0121036 A1 May 3, 2018

(51) Int. Cl.
G06F 3/00 (2006.01)
H04L 29/06 (2006.01)
H04L 29/08 (2006.01)
G06F 3/0481 (2013.01)

(52) U.S. Cl.
CPC ............ H04L 67/42 (2013.01); G06F 3/0481 (2013.01); H04L 67/02 (2013.01); H04L 67/1097 (2013.01); H04L 67/22 (2013.01)

(58) Field of Classification Search
CPC .. G06F 3/0482; G06F 17/3053; G06F 17/211; G06F 17/2264; G06F 17/30528; G06F 17/30554; G06F 17/30867; G06F 17/30905; G06F 17/30991; G06F 8/38; G06F 9/451; H04L 67/42; H04L 67/02; H04L 67/1097; H04L 67/22
See application file for complete search history.

(56) References Cited

U.S. PATENT DOCUMENTS

| | | | | |
|---|---|---|---|---|
| 5,396,264 A | * | 3/1995 | Falcone | G06F 3/0482 340/7.55 |
| 6,047,312 A | * | 4/2000 | Brooks | G06F 9/465 709/203 |
| 6,133,912 A | * | 10/2000 | Montero | G06Q 30/02 715/716 |
| 6,141,759 A | * | 10/2000 | Braddy | G06F 9/5044 709/203 |
| 6,266,060 B1 | * | 7/2001 | Roth | G06F 3/0482 715/206 |
| 6,898,633 B1 | * | 5/2005 | Lyndersay | H04L 63/08 709/217 |
| 8,180,376 B1 | * | 5/2012 | Merritt | H04W 24/10 455/456.2 |

(Continued)

Primary Examiner — Wilson W Tsui
(74) Attorney, Agent, or Firm — Shook, Hardy & Bacon, L.L.P.

(57) ABSTRACT

Systems and methods provide for dynamic menu content for context menus for an object stored on a client device. Requests for context menu content are sent from the client device to a remote server associated with a type of object corresponding to the object stored on the client device. The remote server generates and sends menu content, including one or more custom menu items, to the client device. Upon a user's selection of a menu item, an indicator of the selected menu item is sent to the remote server and an action associated with the selected item is performed. Information relating to requests for menu content and selections of menu items are recorded and, in some embodiments, used as menu content usage data for determining menu content for subsequent requests. Menu content usage data may be used to increase selections of certain menu items and to optimize user experience.

20 Claims, 5 Drawing Sheets

(56) References Cited

U.S. PATENT DOCUMENTS

| | | | | |
|---|---|---|---|---|
| 8,307,101 B1* | 11/2012 | Mui | ................ | G06Q 10/063 707/709 |
| 2008/0163260 A1* | 7/2008 | Lin | ................ | G06F 17/30893 719/320 |
| 2008/0319952 A1* | 12/2008 | Carpenter | ............ | G06F 17/3064 |
| 2009/0199080 A1* | 8/2009 | Fox | ............ | G06F 8/38 715/207 |
| 2009/0327460 A1* | 12/2009 | Yoo | ............ | G06F 9/546 709/221 |
| 2010/0031168 A1* | 2/2010 | Loriedo | ............ | G06F 17/30896 715/760 |
| 2012/0095834 A1* | 4/2012 | Doig | ............ | G06F 17/30867 705/14.53 |
| 2013/0174041 A1* | 7/2013 | Chakravarthy | ....... | G06F 3/0482 715/733 |
| 2014/0344247 A1* | 11/2014 | Procopio | ............ | G06F 16/248 707/722 |

* cited by examiner

SERVER-DRIVEN CUSTOM CONTEXT MENUS

BACKGROUND

Operating systems provide facilities for creating context menus that appear upon request via user input, such as a right-click mouse operation, and that provide a set of options the user may invoke. Menu content locally provided for context menus, however, must be preprogrammed into the operating system or into a locally stored application. Any changes to the menu content, such as adding new features, removing unused features, or implementing a new format for displaying the existing menu items, must be programmed into the local device to be utilized by the user. Additionally, there is no current mechanism for providing feedback on a user's use of the menu items, limiting the ability to improve upon the menu content for increased user satisfaction. In other words, the content for the context menus are static and unresponsive to a user's usage.

SUMMARY

Embodiments of the present invention relate to, among other things, generating, through a remote server, custom menu content for a context menu for an object stored on a client device. Upon a user's request for a context menu, a remote server associated with the type of object corresponding to the object stored on the client device receives a request for custom menu content. The menu content from the server may be customized based on the object's attributes, such as the type of object or object language, for example, and, in some embodiments, the user's subscription level indicating authorization to access different menu content. The menu content, which includes one or more custom menu items, is communicated to the client device for presentation to the user. When a user selects a menu item from the context menu, an indication of the selected item is sent to the remote server, and an action associated with the selected menu item is performed. When the selected menu item is a custom menu item sent from the remote server, the remote server may perform the requested action. In some embodiments, the menu content is determined from the remote server based on menu content usage data. The menu content usage data provides information regarding previous requests for menu content and selections of menu items and, in some embodiments, is specific to the type of object corresponding to the object stored on the client device.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
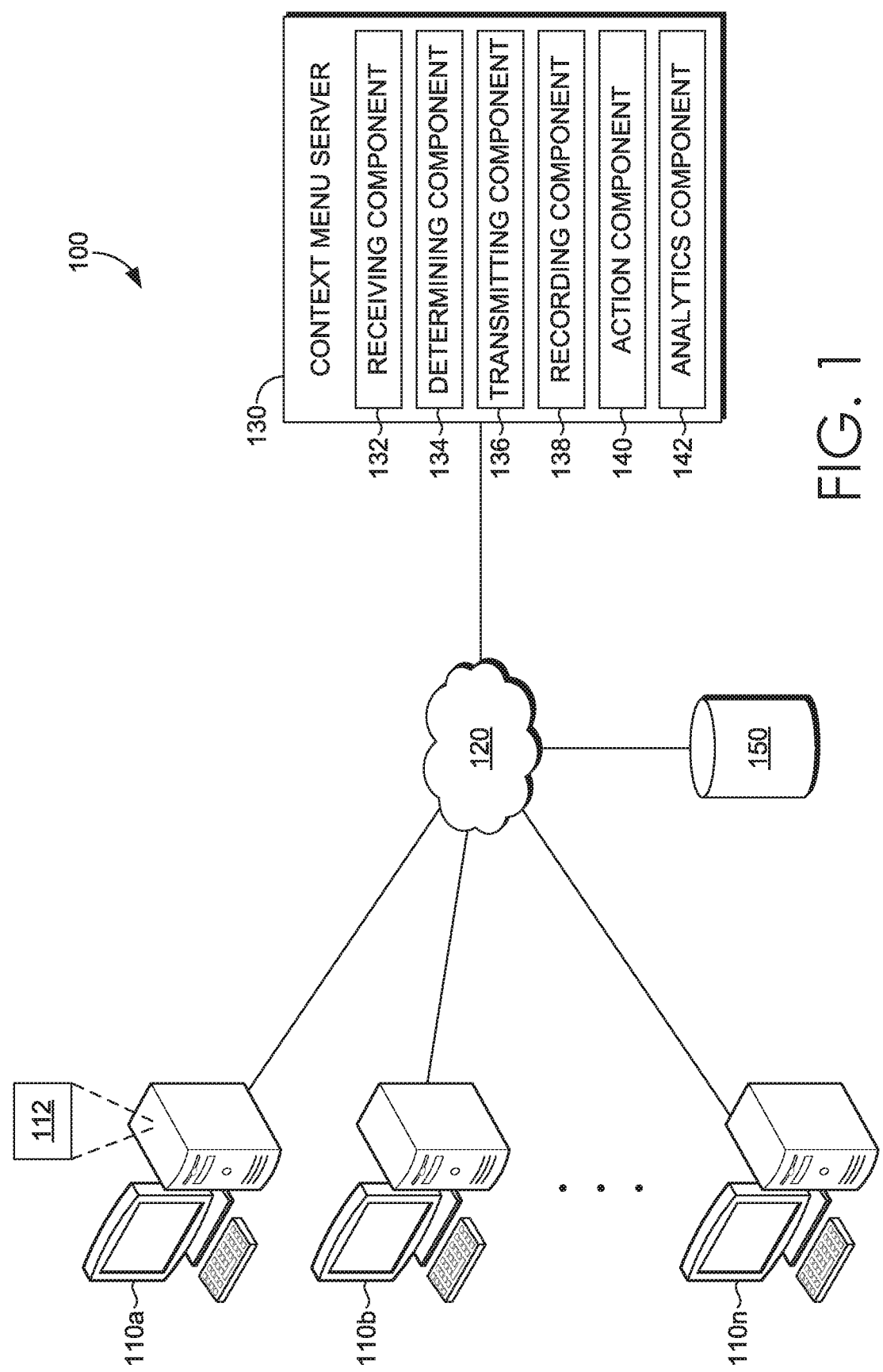
FIG. 1 depicts a block diagram illustrating an example operating system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to, among other things, generating dynamic, custom menu content for a context menu for an object stored on a client device. As used herein, an object refers to a data structure locally stored on the client device and does not include data structures on a web page. Some embodiments of the present invention, for instance, generate and provide filesystem menu content for a file or file folder object accessed through a filesystem of the client device that controls storage and retrieval of data.

Operating systems generally provide facilities for creating context menus that appear upon request via a particular user input, such as a right-click mouse operation. Context menus, which may also be referred to as right-click menus or shortcut menus, provide a set of options or functions the user may invoke with respect to a selected object stored on the client device. Menu content for context menus for objects stored on a client device, such as files or file folders, traditionally is predetermined by menu content programmed into the operating system or into locally stored applications. To provide updated content for context menus, including adding new menu items, removing unused or old items, and adjusting the presentation format of the menu items, new code for the operating system or application would need to be installed on the client device, which can be a disruptive process. Accordingly, because preprogrammed menu content cannot be easily updated, content for context menus provided through traditional methods is static and unresponsive to newly provided functions or changes to users' interactions with the content.

To provide dynamic content for context menus, embodiments of the present invention generate server-driven content for context menus. In other words, custom content for a context menu is provided by a remote server. Specifically, upon a user's request to a client device for a context menu, a remote server receives a request for custom menu content and determines the custom menu content for that request. In some aspects, the remote server is associated with a type of object corresponding to the object for which the request was made. The menu content is customized in that it is based on the object, including the type of object, for which the request is made and, in some embodiments, the user who initiated the request. The menu content, which includes one or more custom menu items, is communicated to the client device for presentation to the user. The custom menu content from the server may be presented with menu content preprogrammed into the client device, such as default menu items. When a user selects an item from the context menu, an indication of the selected item is sent to the remote server, and an action associated with the selected menu item is performed. In some embodiments, when the selected menu item is a custom menu item, the remote server performs the requested action. By utilizing a server remote from the client device, menu content may be updated more easily, providing dynamic menu items, and may be tailored for a particular type of object and/or user. Although server-driven menu content has been used for web development, servers are not used for determining content for context menus for objects stored on a client device as with embodiments of the present invention.

Some embodiments of the present invention utilize analytics data relating to context menus and user selections to determine the custom menu content. While analytics has been previously used to track usage for websites and desktop applications, there is currently no mechanism for providing feedback on a user's use of the context menu items on a client device or incorporating the feedback to dynamically update the menu content for improved user experience of the menu content. As previously mentioned, embodiments of the present invention include providing indications of a user's selection of a menu item from a context menu having custom, server-driven content. As such, in some embodiments, data corresponding to a user's selection may be recorded and stored in association with data corresponding to the request for menu content. Future determinations of menu content is then determined based on at least this menu content usage data. In this way, the server may determine whether to include or exclude menu items based on the frequency with which users select a particular menu item when the item is presented. More frequently selected menu items, for instance, may be determined to be included in the menu content provided to the user. In some embodiments, additional menu content, such as menu item labels and the order in which the items are listed when presented to the user, are also determined based on the menu content usage data. For example, in response to menu usage data indicating that users rarely select a particular custom menu item, the server may change words or phrases used to label that custom menu item and continue to acquire data to determine whether the new label should remain or be modified based on whether the selection frequency changes. Accordingly, using analytics, embodiments of the present invention can learn what is driving user selection of menu items and leverage this information to dynamically update the menu content to increase selection of certain menu items and increase user satisfaction.

With reference now to the drawings, FIG. 1 is a block diagram illustrating an exemplary system 100 for generating and providing dynamic menu content for context menus in accordance with implementations of the present disclosure. It should be understood that this system 100 and other arrangements described herein are set forth only as examples. Other arrangements and elements (e.g., machines, interfaces, functions, orders, and groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes one or more user devices, such as user devices 110a and 110b through 110n, a network 120, a context menu server 130, and one or more data stores 150. It should be understood that the system 100 shown in FIG. 1 is an example of one suitable operating environment. Each of the components shown in FIG. 1 may be implemented using any type of computing device, such as the computing device 500, described in connection to FIG. 5, for example. These components may communicate with each other via the network 120, which may be wired, wireless, or both. The network 120 can include multiple networks or a network of networks but is shown in simple form so as not to obscure aspects of the present disclosure. By way of example, the network 120 can include one or more wide area networks (WANs), one or more local area networks (LANs), one or more public networks, such as the Internet, and/or one or more private networks. Where the network 120 includes a wireless telecommunications network, components such as a base station, a communications tower, or even access points (as well as other components) may provide wireless connectivity. Because networking environments are commonplace in offices, enterprise-wide computer networks, intranets, and the Internet, the network 120 is not described in significant detail. Additionally, it should be understood that any number of user devices, servers, and data sources may be employed within the system 100 within the scope of the present disclosure. Although not illustrated, each of the above may comprise a single device or multiple devices cooperating in a distributed environment.

In exemplary embodiments, user devices 110a through 110n are client devices on a client-side of the system 100 while the context menu server 130 is on a remote server-side of the system 100. Context menu server 130 may comprise server-side software designed to work in conjunction with client-side software on user devices 110a through 110n. An example of such client-side software is application 112 on user device 110a. Each of the other user devices may include a similar application with similar functionality.

User devices 110a through 110n each comprise any type of computing device capable of being operated by a user. In some implementations, user devices 110a through 110n are the type of computing devices described in relation to FIG. 5 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

User devices 110a through 110n each include one or more processors and one or more computer-readable media or computer storage media having computer-readable instructions executable by the one or more processors. The instructions may be embodied by one or more applications, such as application 112, capable of facilitating the exchange of information between user device 110a, for instance, and the context menu server 130. It is contemplated herein that "application" be interpreted broadly. As one example, an application can be installed on an operating system of a user device. As another example, an application can be a service integrated into an operating system of a user device or an application installed on the device. For instance, application 112 may be a filesystem of an operating system or may be a filesystem of a file hosting service. Additionally, application 112 is referred to as a single application for simplicity, but its functionality can be embodied by one or more applications in practice.

The context menu server 130 is configured to process requests for context menu content to provide dynamic menu content for a particular object stored on a client device, such as user device 110a through 110n. The context menu server 130 includes one or more processors and one or more computer storage media having computer-readable instructions executable by the one or more processors. The instructions may implement one or more of a receiving component 132, a determining component 134, a transmitting component 136, a recording component 138, an action component 140, and an analytics component 142, as shown in FIG. 1.

The receiving component 132 of the context menu server 130 is configured to receive information relating to requests for custom menu content for an object stored on a user device, such as user device 110a through 110n. The request for menu content is sent from user device 110a and, in some aspects, is sent using application 112 of user device 110a. For example, the request is sent from application 112 of the user device 110a, such as an operating system or other application, using HTTP or another protocol. In some embodiments, the request sent from the user device 110a may also include data providing details associated with the request. Such additional details may include one or more of the following: the name of the object for which the request was made; the type of object for which the request is made; the language in which the object is provided; the time and/or date of the request; a user identification for a user who initiated the request; a subscription level of the user; the location of the user; a version of software or operating system being used on the user device 110a, and the like. These details may be encoded into the request using XML, JSON, or another suitable format.

The context menu server 130 is remote from the user device 110a that is requesting menu content and may be associated with the type of object for which the request is sent. A type of object may be a particular type of file, such as, for instance, a word processing file or a JPEG image file. For example, if the object is an image file that may be opened with an application within Adobe® Creative Suite®, such as Adobe® Photoshop®, the context menu server 130 receiving the request may be associated with Adobe® Photoshop® and/or Adobe® Creative Cloud®. Although only one context menu server 130 is illustrated in FIG. 1, it is appreciated that system 100 may include multiple context menu servers that are each associated with different types of objects. In addition to receiving the request, the receiving component 132 is also configured to receive other information from user devices 110a, such as the selected menu item after the menu content is provided to the user.

Upon receiving the request for menu content, the determining component 134 of the context menu server 130 determines what menu content to send for the context menu. The menu content includes at least one or more menu items, which are options for the user to select to perform a particular action with respect to the object. For instance, the menu content may include an item for converting the object to a PDF file. In some embodiments, the menu content includes a label for each menu item. The label is what is displayed to a user viewing the context menu to identify a particular menu item and comprises a written description and/or an icon. The menu content also includes a listing order, which is the order in which the one or more menu items are presented within the context menu as it is presented to the user, and a presentation language, which is the language in which the menu items are displayed to the user.

Menu content may also include callback URLs associated with each menu item. When a menu item is selected on a user device, the callback URL is executed, allowing the context menu server 130 to track menu item selections, as described in greater detail with respect to the analytics component 142. Additionally, the callback URLs may be used to perform actions associated with custom menu items when the actions are performed by the context menu server 130 instead of being performed locally by user device 110a. A custom menu item for opening an object in Adobe® Creative Cloud®, for example, may include a callback URL (e.g., http://creative.adobe.com/files?tracking_id=54678) that will be included within the menu content that is used to open the object in Creative Cloud®. As another example, a custom menu item for converting the object to an Adobe® PDF file may include a callback URL that informs the context menu server 130 to convert the object to an Adobe® PDF file and send the PDF file back to the user device 110a.

As previously mentioned, the context menu server 130 may be associated with a type of object corresponding to the object for which the request is made, and, therefore, any menu content from the context menu server 130 may be based on the object, including the type of object, for which the request is made. In some embodiments, other information is also used to determine menu content for a particular request, including any of the details that may be sent with the request, such as a time of the request, a date of the request, a country from which the request is made, and/or a subscription level of the user associated with the request. A subscription level indicates a user's authorization to access certain menu items or functions. For instance, some applications may provide premium services for which a user pays that include additional functions not available to other users. Accordingly, the determining component 134 may consider whether a user associated with the request has a subscription level that provides access to premium services and, if so, provide menu items associated with those services. Additional subscription levels may include free trial, student, discounted, paid, and the like.

In some embodiments, determining menu content is based on menu content usage data that is analyzed by the analytics component 142 of the context menu server 130. Menu content usage data comprises data associated with previous requests for menu content and at least indicates whether a particular custom menu item was selected by the user when presented. The analytics component 142 determines the selection frequency, or the frequency with which a particular menu item is selected, and the optimal appearance of the menu content, including labels for menu items and the listing order for menu items. For example, menu content usage data may indicate that a particular menu item, such as a menu item to "Convert to PDF," has been presented to users 500 times and selected 40 times, indicating that the particular menu item is selected 8% of the time it is presented as an option. The menu content usage data may be analyzed according to a particular type of object. For instance, the analytics component 142 may determine that although the menu item "Convert to PDF" is selected 8% of the time it is presented overall, the item is selected 17% of the time that is presented for a word processing document file, indicating a greater selection frequency for that particular object type. In some embodiments, the menu content usage data may be analyzed based on a time the request was initiated, a day of the week the request was initiated, a country from which the request was initiated, and a type of user, such as a user's subscription level, who is associated with the request.

The analytics component 142 provides feedback to context menu server 130 so that the determining component 134 may provide menu content that will maximize menu item selection. For example, the analytics component 142 may analyze the menu content usage data and determine that items with labels having written descriptions of less than three words are selected more frequently than items with written descriptions of three or more words. This analysis may prompt the determining component 134 to provide written descriptions for menu items with only one or two words. The feedback from the analytics component 142 may also be used by the determining component 134 to improve user experience and, therefore, overall user satisfaction. For instance, the analytics component 142 may determine that users consistently select "Convert to PDF" more frequently than other custom menu items, thereby prompting the determining component 134 to provide a listing order that presents "Convert to PDF" menu item higher in the menu or in a location most convenient for selection by the user to optimize a user's experience. Accordingly, using the analytics component 142, the context menu server 130 may determine how well it is performing in terms of providing useful menu content and dynamically adjust the menu content accordingly.

Figure 2:
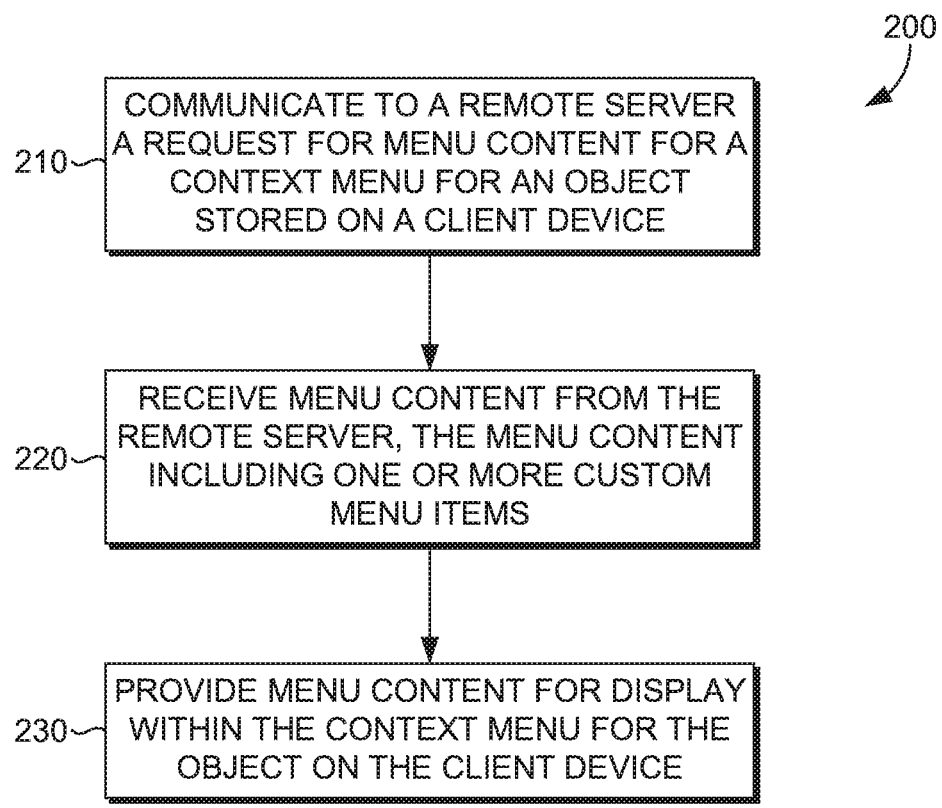
FIG. 2 depicts a flow diagram showing a method for providing dynamic content for a custom context menu in accordance with implementations of the present disclosure.

Once menu items are determined, the transmitting component 136 of the context menu server 130 communicates the menu content to the user device that sent the request for menu content, which will present the menu content, including the one or more custom menu items, to the user for selection as discussed in greater detail with respect to FIG. 2. In some aspects, the menu content, including labels and callback URLs, is encoded into a suitable format using XML or JSON, for example, and sent to the user device 110a using HTTP or another protocol. Upon receiving the menu content, the user device 110a decodes the menu content and stores it in a format and in a memory layout specified by the application 110a, such as the operating system, of the user device 110a. Once stored in the appropriate format and layout, the menu content may be provided to the application 112 according to the application programming interface (API) of the application 112.

In some embodiments, the context menu server 130 includes an action component 140 configured to perform an action associated with a menu item. As previously mentioned, each menu item is associated with an action to be performed with respect to the object for which the request is made, and some custom menu items are associated with actions that are to be performed by the remote context menu server 130. For instance, a custom menu item may be to open the object in Adobe® Creative Cloud®. When a user selects the menu item through a user interface of user device 110a, a request may be made through network 120 to perform the action. The request may be in the form of an HTTP request or using other request protocols. As explained in more detail with respect to FIG. 2, in some embodiments, the action associated with the selected menu item, including a custom menu item, may be locally performed by user device 110a, instead of by the context menu server 130.

The recording component 138 is configured to record requests for menu content for context menus and data associated with the requests. Data associated with the requests may include, for instance: the name of object for which the request was made; the type of the object for which the request was made; the user who initiated or is otherwise associated with the request, including a subscription level of the user; a date and time of the request; and a country from which the request was initiated. The recording component 138 may also record information identifying menu item selections. Specifically, the recording component 138 may record whether a custom menu item provided by the context menu server 130 was selected by a user on a user device, whether a default menu item was selected, or whether no menu item was selected. This information identifying the selected menu item may be stored in association with data about the request and/or data about what menu content was sent in response to the request.

Continuing with FIG. 1, the system 100 also includes storage 150. Storage 150 generally stores information including data, computer instructions (e.g., software program instructions, routines, or services), logic, profiles, and/or models used in embodiments. For instance, storage 150 may store rules, conditions, associations, classification models, algorithms, or other criteria to perform the disclosed methods of determining and providing menu content for a custom context menu. Although depicted as a single data store component, storage 150 may be embodied as one or more data stores or may be part of a cloud-based platform. Additionally, storage 150 may reside on a server housing the context menu server 130 or it may be remote from the context menu server 130.

Storage 150 includes menu content usage data recorded by the recording component 138 of the context menu server 130. Storage 150 also includes the menu content provided by the context menu server 130 for context menus. Menu content may be updated on a periodic or as-needed basis to provide up-to-date content for context menus for a particular type of object. For example, if a new function is developed in connection with an application, such as application 112, it may be desirable to provide the new function as possible menu item for a context menu for an object associated or otherwise compatible with the application. In such a case, the menu content may be updated to include a new menu item for performing the new function. Updates to menu content may also include updates to existing menu content, such as modified icons or formatting of the existing menu items.

Referring next to FIG. 2, a block diagram illustrating a method 200 for dynamically providing a context menu is provided. Each block of the method 200 and any other methods described herein, including method 300 of FIG. 3 and method 400 of FIG. 4, comprise a computing process that may be performed using any combination of hardware, firmware, and/or software. For instance, various functions may be carried out by a processor executing instructions stored in memory. Methods 200 may also be embodied as computer-usable instructions stored on computer storage media. Methods 200 may be provided by a standalone application, a service or hosted service (standalone or in combination with another hosted service), or a plug-in to another product, to name a few. Method 200 may be performed at least in part, for instance, by a client device, such as user device 110a of FIG. 1.

As shown at step 210, method 200 includes communicating a request for menu content for a custom context menu for an object stored on a client device, such as one of the user devices 110a through 110n in FIG. 1. The request may be sent from the client device to a remote server, such as the context menu server 130 of FIG. 1. The request includes data associated with the request, such as information as to the type of object for which the request is being made, and may include other information relating to the object, such as an object size and a date and/or time the object was created or last modified. In some embodiments, the request includes a date and/or time of the request, a country from which the request was initiated, and a subscription level of a user who initiated the request or is otherwise associated with the object and/or computing device from which the request came.

This request may be initiated from a user of the client device performing a right-click mouse operation, or other secondary button operation, over or near the object on a user interface of the client device, indicating the user wants to retrieve a context menu. In other embodiments, a context menu request is initiated by the user through other input mechanisms, such as through a primary mouse button, a keyboard, a touch pad, and the like. Alternatively, in some embodiments, the request for menu content may be sent to the remote server prior to a user initiating a context menu request through user input.

Multiple remote servers may be capable of providing menu content for context menus, but to receive menu content specifically tailored for the object for which the request was made, a request is sent to a remote server that is associated with a type of object corresponding to the type of object stored on the client device. As such, some embodiments of method 200 include, prior to communicating the request to the remote server, determining that the remote server is associated with a type of object corresponding to the object for which the request is made. This determination may be made by an application on the client device, such as application 112 in FIG. 1. Additionally, in some embodiments, the request for menu content is first communicated by an operating system of the client device to the application on the client device capable of determining which server to send the request and of communicating with that server. As an example, the application may be Adobe® Creative Cloud Files Synchronization service or another file sharing application.

At step 220, the menu content is received by the client device from the remote server to which the request was sent. The menu content includes one or more custom menu items. The menu content also may also include a label for each custom menu item; a callback URL for tracking menu item selections and performing an action associated with each custom menu item, where applicable; and a listing order for the custom menu items. In some embodiments, the menu content is initially received by the application on the client device and then communicated to the operating system of the client device.

At step 230, the custom menu content from the remote server is provided for display within the context menu for the object on the client device. The custom menu content is displayed on a graphic user interface generated by the operating system or an application, such as application 112 in FIG. 1, on the client device. Providing the menu content may include displaying a label for each of the one or more custom menu items and displaying the custom menu items in accordance with the specified listing order. In some embodiments, the custom menu items are provided for display within a context menu that also includes default menu items. Default menu items are menu items that are automatically populated within a context menu by the operating system of the client device. Default menu items include "delete," "copy," "paste," select," "rename," and the like. Each menu item is presented as a selectable menu item such that the user may select the desired menu item with a cursor, for example, within the context menu.

In some embodiments, after the user selects a menu item, the method 200 further includes receiving an indicator of the selected menu item. The indicator of the selected menu item may first be received by the operating system on the client device and then communicated to an application capable of communicating with the remote server. The indicator of the selected menu item is then communicated to the remote server. The indicator of the selected menu item may indicate that the user selected one of the custom menu items included in the menu content provided by the remote server, that the user selected one of the default menu items, or that the user did not select any menu items.

In some embodiments, the method 200 also includes locally performing an action associated with the selected menu item. For instance, a selected menu item of "copy" may be locally performed by the operating system of the client device. The action associated with the selected menu item may be locally performed by an application on the client device.

Figure 3:
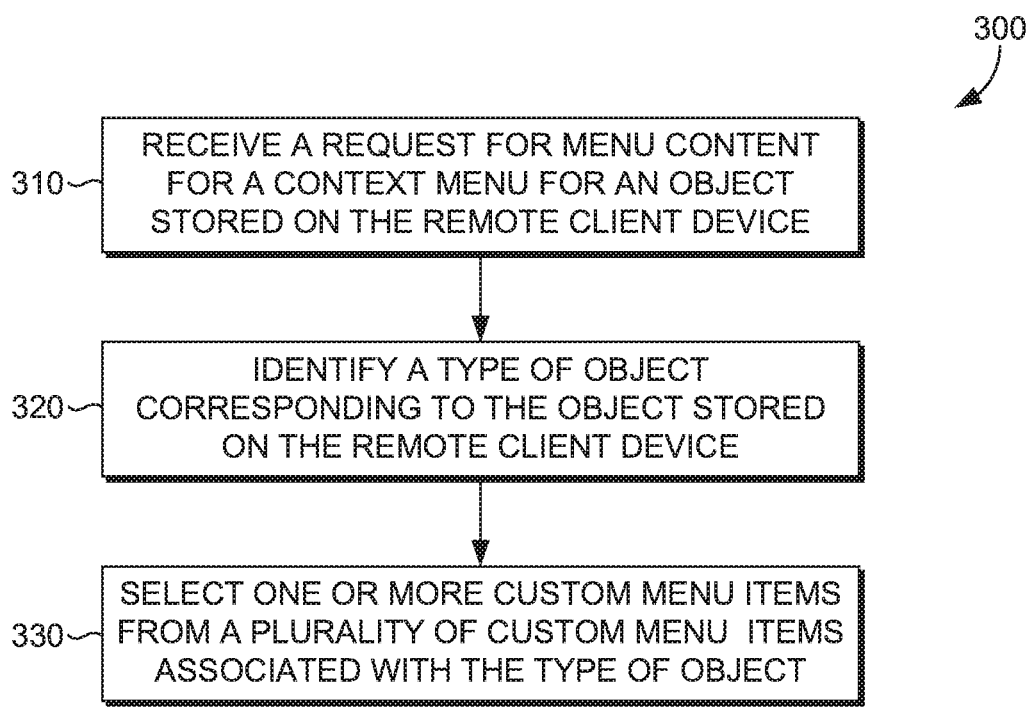
FIG. 3 depicts a flow diagram showing a method for determining dynamic menu content for a custom context menu in accordance with implementations of the present disclosure.
Figure 4:
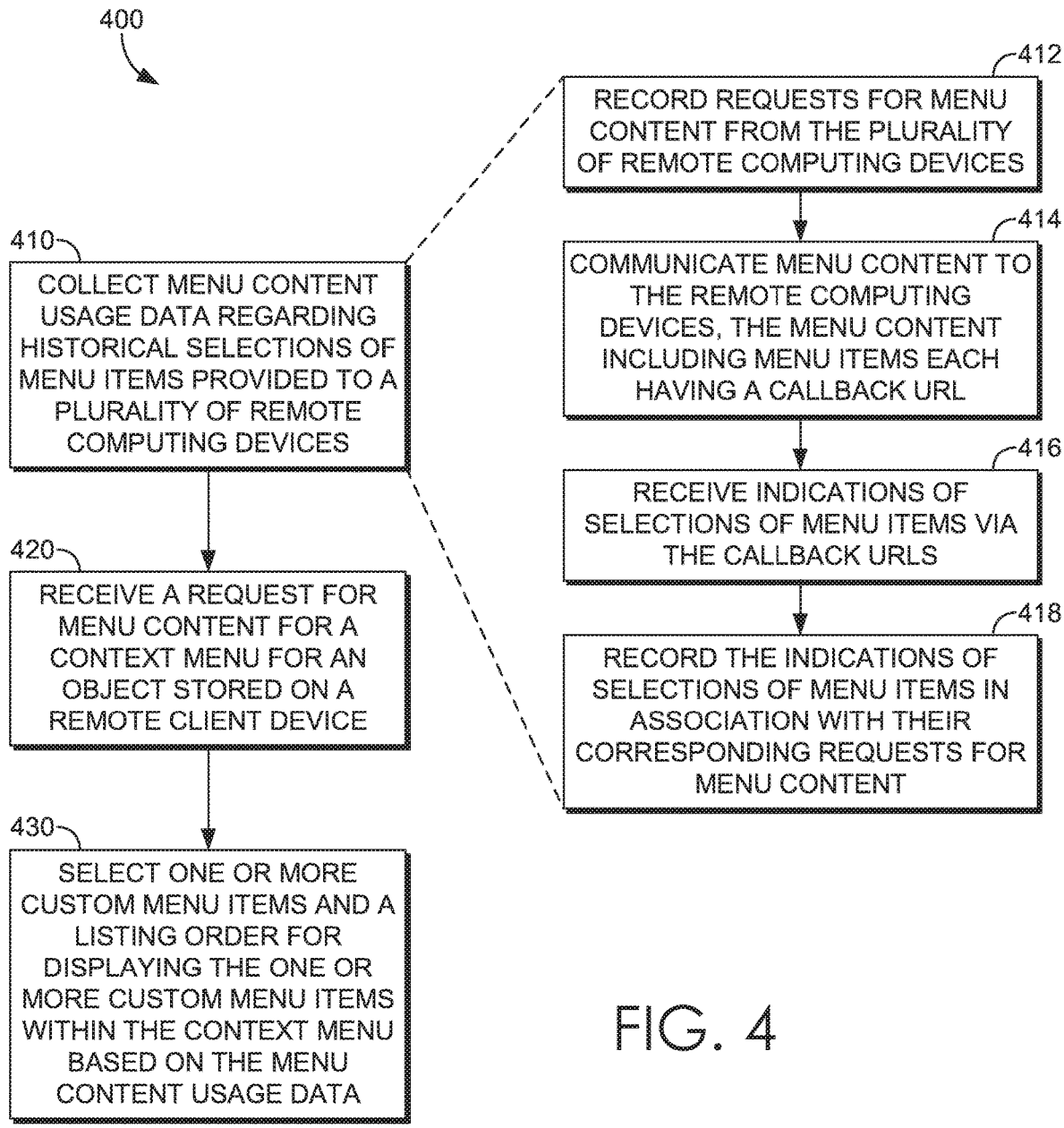
FIG. 4 depicts a flow diagram showing a method for determining dynamic menu content for a custom context menu in accordance with implementations of the present disclosure.

As previously mentioned, a server device determines dynamic menu content for a context menu for an object stored on a remote client device, such as one of user devices 110a through 110n, in accordance with aspects of the present disclosure. FIGS. 3 and 4 provide flow diagrams illustrating methods for determining dynamic menu content for context menus. Just as with method 200 of FIG. 2, methods 300 and 400 may be provided by a standalone application, a service or hosted service (standalone or in combination with another hosted service), or a plug-in to another product, to name a few. Methods 300 and 400 may be performed at least in part, for instance, by the context menu server 130 of FIG. 1.

Turning to FIG. 3, method 300 provides a method for determining menu content for context menus based on the type of object for which the request is made. Accordingly, at step 310, a request for menu content for a context menu for an object stored on a remote client device is received, as shown in step 310. The request may be sent from the remote client device, such as one of user devices 110a through 110n of FIG. 1, and received by a remote server, such as the context menu server 130 of FIG. 1. The request for menu content includes data associated with the request itself, including information as to the type of object for which the request was made, such as a file type. In some embodiments, other information relating to the object, such as an object size and a date and/or time the object was created or last modified, is also part of the information received with the request. The request may also include a date and/or time the request was initiated, a country from which the request was initiated, and a subscription level of a user who initiated the request or is otherwise associated with the request. A user who is associated with the request may include a user who is associated with the object, such as a person who created or last modified the object, or a user associated with the client device that sent the request. Upon receiving the request, at step 320, a type of object corresponding to the object stored on the remote device is identified. For instance, the type of object may be a type of a file, such as a JPEG file or PSD file.

At step 330, one or more custom menu items are selected for the menu content for the context menu. The custom menu items are selected from a plurality of custom menu items associated with the type of object identified at step 320 and stored in a data store, such as storage 150 of FIG. 1. Accordingly, in accordance with method 300, the custom menu items may be based on the type of object corresponding to the object for which the request is made. For instance, if the type of object is a PSD file, the menu items are associated with an action that may be performed with respect to a PSD file, such as covert PSD file to a JPEG file, or Open in Adobe® Creative Cloud®. Additional menu content may include a label for each of the selected custom menu items and a listing order for displaying the selected custom menu items within the context menu. In some aspects, the label and the listing order are also determined based on the type of object corresponding to the object for which the request was made.

As method 300 utilizes the type of object to determine menu content, menu content may be determined by additional or alternative factors. Turning to FIG. 4, for example, method 400 provides a method for determining menu content for context menus based on menu content usage data. Accordingly, at step 410, method 400 includes collecting menu content usage data regarding historical selections of menu items previously provided to users. Collecting menu content usage data may be performed over a period of time through data recorded associated with previous context menu requests. The requests for menu content from a plurality of remote compute devices may be received and recorded, as shown in step 412. Similar to the request received in step 310 of method 300, these requests may include information as to the type of object for which the request was made, the time and date of the request, a country from which the request was initiated, and the user who initiated or is otherwise associated with the request. This information may be recorded and stored in a data store, such as storage 150 of FIG. 1.

At step 414, in response to each of the requests from the plurality of remote computing devices, menu content is communicated to the remote computing device. The menu content includes one or more menu items, and each menu items includes a callback URL that will be invoked upon the selection of the menu item. The callback URL allows tracking of information as to the menu item selection and, in some embodiments, is used to perform an action associated with the menu item.

After the menu content is communicated to the remote computing devices, indications of selections of menu items are received. These indications of selections are received via the callback URLs associated with the selected menu item. At step 418, the indications of selections of menu items are then recorded in association with their corresponding requests for menu content recorded at step 412. In this way, menu selections for each request may be tracked. In some aspects, when a menu item communicated at step 414 is not selected by a user, such as when a default menu item is selected or no menu item is selected, the method includes recording no selection of custom menu items. The selection indicators and the requests may be recorded and analyzed by the analytics component 142 of the context menu server 130 of FIG. 1 and stored as the menu content usage data in the storage 150.

In some aspects, the menu content usage data is used to determine selection frequencies. A selection frequency is a frequency with which a particular custom menu item has been previously selected when presented to the user. Selection frequencies may be for a menu item in general or may be specific to a type of object, a user subscription level, a time of the day of the request, a country for the request, and the like. For instance, the analytics component 142 may determine that while the menu item "Open in Creative Cloud" is selected 5% of the time it is presented overall, the item is selected 7% of the time that is presented to a user between 5 p.m. and 10 p.m., indicating a greater selection frequency for the menu item during the evening.

Once at least some menu content usage data is collected, a new request for menu content for a context menu for an object stored on a remote client device is received from the remote client device, as shown at step 420. Just as with the previous requests from the plurality of remote computing devices, this request may be recorded along with data associated with the request, such as the object for which the request is made, the user who initiated or is associated with the request, a date and time of the request, and country from which the request is made.

At step 430, in response to the request received, one or more custom menu items and a listing order are selected as menu content based on the menu content usage data. In some aspects, the custom menu items and listing order are selected using one or more selection frequencies from the menu content usage data to optimize a user's experience. For example, in some aspects, menu items having the greatest selection frequencies are selected as menu content while items with lower selection frequencies are not selected. Similarly, in some aspects, menu items having greater selection frequencies may be placed near the top of the listing order or in positions most accessible to the user compared to items with lower selection frequencies. Additionally, because the selection frequencies may be specific to the type of object, the user, the date and time, and/or the country from which the request was initiated, the selection frequencies used to determine the custom menu items and the listing order may be those selection frequencies associated with requests having similar attributes as the current request.

Other menu content, such as labels comprising a written description and/or icon for the menu items, may also be determined based on the menu content usage data. For instance, written descriptions, icons, and formatting choices, including the font and type size of the written descriptions, for the menu items may be selected from those previously used for menu items having high selection frequencies to increase the chance of those menu items being selected.

FIG. 4 illustrates how menu content, including custom menu items and the listing order, is selected based on the menu content usage data; however, it is contemplated that additional factors may be considered when selecting the menu content. For example, the menu content could be based on an object type and menu content usage data. In other embodiments, the menu content may be based on the object type, the menu content usage data, and a subscription level of the user associated with the request, or any combination thereof.

Although not specifically illustrated in FIG. 4, method 400 may further include communicating menu content, including the custom menu items and listing order selected at step 430, to the remote client device, for presentation to a user as detailed with respect to FIG. 2. Similar to steps 416 and 418, an indication of a selected menu item is then received from the remote client device and recorded with the menu content usage data to be used for selection of menu content provided for subsequent requests. As such, the selection frequencies within the menu content usage data are adjusted based on the newly received selection indication.

Additionally, in some aspects, an action associated with the selected menu item is performed when the selected menu item is one of the one or more custom menu items. The action may be performed by the remote server upon receiving the indicator of the selected menu item. In other embodiments, however, a request to perform the action is received by the remote server separately from the indicator of the selected menu item. Where the selected menu item includes a callback URL, opening the callback URL may be the request to the remote server to perform the action. In some embodiments, the request for performing an action is executed through an HTTP request protocol, but it is contemplated that other protocols may be used.

Figure 5:
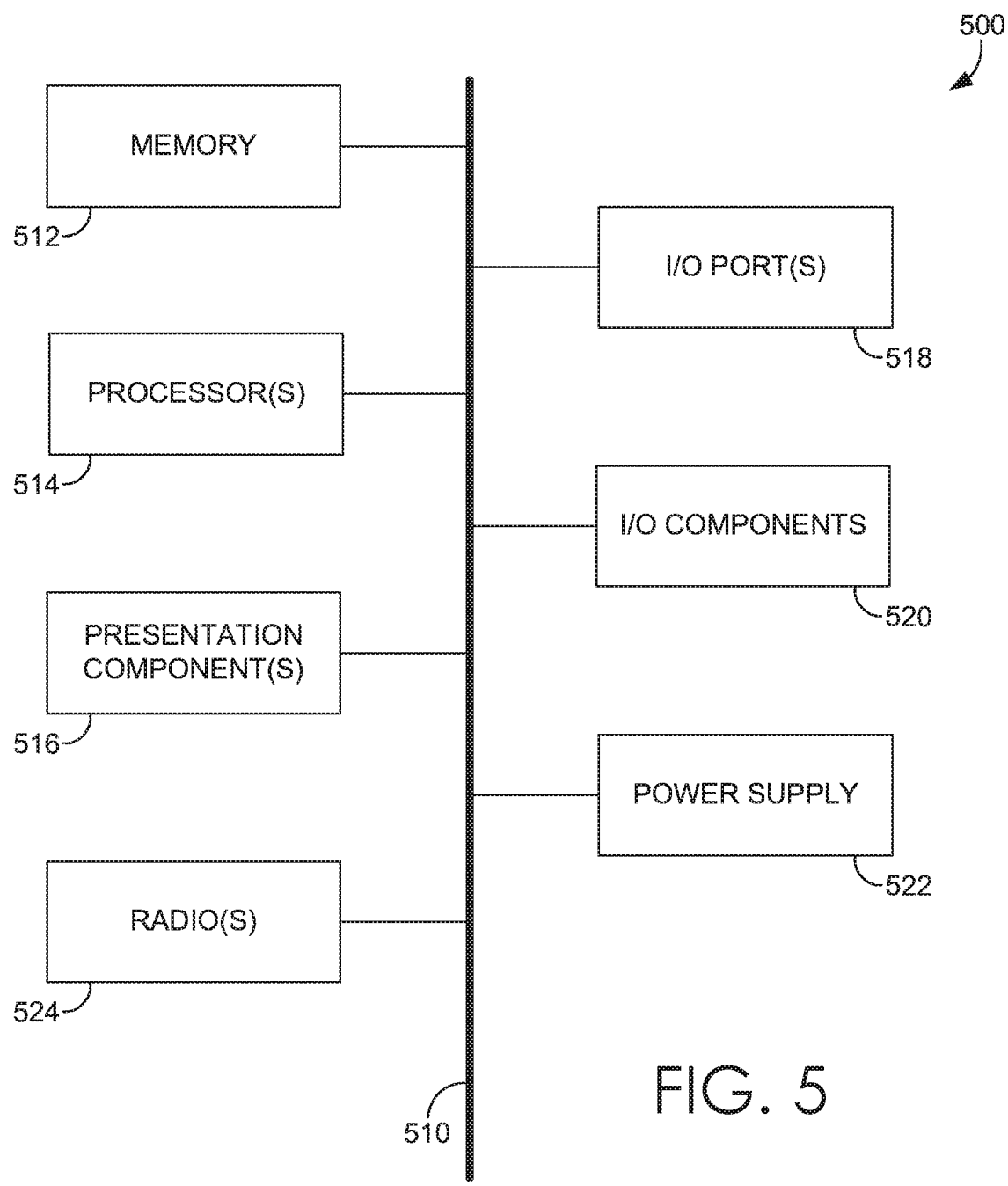
FIG. 5 depicts a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522, and a radio 524 if applicable. Bus 510 represents what may be one or more busses (such as an address bus, data bus, or combination thereof). Although the various blocks of FIG. 54 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion.

In some aspects, the computing device 500 may be equipped with a radio(s) 524 that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, or other VoIP communications. As can be appreciated, in various embodiments, radio 524 can be configured to support multiple technologies and/or multiple radios can be utilized to support multiple technologies.

As described above, implementations of the present disclosure relate to techniques for generating and providing, through a remote server, dynamic and custom context for a context menu for objects on a client device. The present invention has been described in relation to particular embodiments, which are intended, in all respects, to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage devices storing computer-useable instructions that, when executed by a computing device, cause the computing device to perform a method, the method comprising:
   at a server associated with a type of object, recording menu content usage data by sending menu content to a plurality of remote devices storing at least one object of the type of object, the menu content including one or more menu items each having a callback URL, and receiving information regarding a selection of the one or more menu items via the callback URL;
   receiving, from a remote client device, a request for menu content for a context menu for an object stored on the remote client device, the request identifying the type of object of the object stored on the remote client device and wherein the request for menu content is sent based on a determination that the server, out of a plurality of servers, is associated with the type of object, the type of object being one of a plurality of types of objects;
   determining menu content for the context menu based on at least the menu content usage data for the type of object by selecting one or more custom menu items out of a plurality of custom menu items based on the type of object and a listing order for displaying the one or more custom menu items within the context menu using one or more selection frequencies within the menu content usage data, wherein each selection frequency indicates a frequency with which a particular custom menu item has been previously selected when presented to users; and
   communicating, to the remote client device, the menu content for the context menu selected using menu content usage data for the type of object.

2. The one or more computer storage devices of claim 1, wherein the method further comprises:
   receiving, from the remote client device, an indicator of a selected menu item; and
   recording the indicator of the selected menu item with the menu content usage data.

3. The one or more computer storage devices of claim 2, wherein the method further comprises performing an action associated with the selected menu item.

4. The one or more computer storage devices of claim 1, wherein determining menu content for the context menu is further based on a subscription level for a user who initiated the request, the subscription level indicating authorization to access the one or more custom menu items.

5. The one or more computer storage devices of claim 1, wherein the menu content further includes a label for each custom menu item within the one or more custom menu items.

6. The one or more computer storage devices of claim 1, wherein selecting the listing order for displaying the one or more custom menu items within the context menu includes placing custom menu items having higher selection frequencies above custom menu items having lower selection frequencies within the listing order.

7. A computerized method comprising:
   at a server associated with a type of object, recording menu content usage data by sending menu content to a plurality of remote devices storing at least one object of the type of object, the menu content including one or more menu items each having a callback URL, and receiving information regarding a selection of the one or more menu items via the callback URL;
   receiving, from a remote client device, a request for menu content for a context menu for an object stored on the remote client device, the request identifying the type of object of the object stored on the remote client device and wherein the request for menu content is sent based on a determination that the server, out of a plurality of servers, is associated with the type of object, the type of object being one of a plurality of types of objects;
   determining menu content for the context menu based on at least the menu content usage data for the type of object by selecting one or more custom menu items out of a plurality of custom menu items based on the type of object and a listing order for displaying the one or more custom menu items within the context menu using one or more selection frequencies within the menu content usage data, wherein each selection frequency indicates a frequency with which a particular custom menu item has been previously selected when presented to users; and
   communicating, to the remote client device, the menu content for the context menu selected using menu content usage data for the type of object.

8. The computerized method of claim 7 further comprising:
   receiving, from the remote client device, an indicator of a selected menu item; and
   recording the indicator of the selected menu item with the menu content usage data.

9. The computerized method of claim 8 further comprising performing an action associated with the selected menu item.

10. The computerized method of claim 7, wherein determining menu content for the context menu is further based on a subscription level for a user who initiated the request, the subscription level indicating authorization to access the one or more custom menu items.

11. The computerized method of claim 7, wherein the menu content further includes a label for each custom menu item within the one or more custom menu items.

12. The computerized method of claim 7, wherein selecting the listing order for displaying the one or more custom menu items within the context menu includes placing custom menu items having higher selection frequencies above custom menu items having lower selection frequencies within the listing order.

13. The computerized method of claim 7, wherein the request for menu content for the context menu further includes one or more of a user who initiated the request, a date and time of the request, and a country from which the user initiated the request.

14. A system comprising:
one or more data stores;
one or more processors that execute computer-usable instructions stored on one or more computer-storage media to perform operations comprising:
at a server associated with a type of object, recording menu content usage data by sending menu content to a plurality of remote devices storing at least one object of the type of object, the menu content including one or more menu items each having a callback URL, and receiving information regarding a selection of the one or more menu items via the callback URL;
receiving, from a remote client device, a request for menu content for a context menu for an object stored on the remote client device, the request identifying the type of object of the object stored on the remote client device and wherein the request for menu content is sent based on a determination that the server, out of a plurality of servers, is associated with the type of object, the type of object being one of a plurality of types of objects;
determining menu content for the context menu based on at least the menu content usage data for the type of object by selecting one or more custom menu items out of a plurality of custom menu items based on the type of object and a listing order for displaying the one or more custom menu items within the context menu using one or more selection frequencies within the menu content usage data, wherein each selection frequency indicates a frequency with which a particular custom menu item has been previously selected when presented to users; and
communicating, to the remote client device, the menu content for the context menu selected using menu content usage data for the type of object.

15. The system of claim 14, wherein the operations further comprise:
receiving, from the remote client device, an indicator of a selected menu item; and
recording the indicator of the selected menu item with the menu content usage data.

16. The system of claim 15, wherein the operations further comprise performing an action associated with the selected menu item.

17. The system of claim 14, wherein determining menu content for the context menu is further based on a subscription level for a user who initiated the request, the subscription level indicating authorization to access the one or more custom menu items.

18. The system of claim 14, wherein the menu content further includes a label for each custom menu item within the one or more custom menu items.

19. The system of claim 14, wherein selecting the listing order for displaying the one or more custom menu items within the context menu includes placing custom menu items having higher selection frequencies above custom menu items having lower selection frequencies within the listing order.

20. The system of claim 14, wherein the request for menu content for the context menu further includes one or more of a user who initiated the request, a date and time of the request, and a country from which the user initiated the request.

* * * * *